Figure 4:
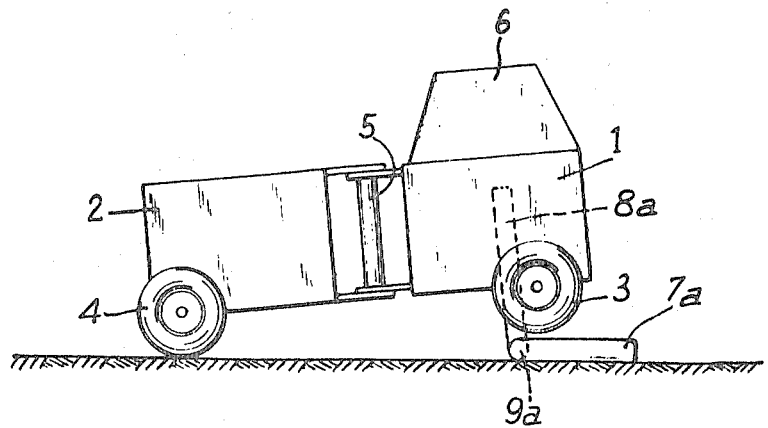

United States Patent

[11] 3,627,267

[72] Inventor Yves Kemper
　　　　　　　Pontchateau, France
[21] Appl. No. 19,163
[22] Filed Mar. 13, 1970
[45] Patented Dec. 14, 1971
[73] Assignee Etablissements J. Sambron
　　　　　　　Pontchateau, France
[32] Priority Mar. 25, 1969
[33] France
[31] 6908747

[54] ARTICULATED PUBLIC WORKS MACHINE OR VEHICLE
13 Claims, 5 Drawing Figs.

[52] U.S. Cl. .................................................. 254/86 R
[51] Int. Cl. .................................................. B60s 9/02
[50] Field of Search .................................... 254/86 R,
　　　86 H; 180/1 A; 280/150.5; 214/132, 133; 172/395,
　　　310; 37/126; 212/145

[56] References Cited
UNITED STATES PATENTS
2,992,016　7/1961　Pilch ............................ 254/132
3,212,659　10/1965　Koch ............................ 254/132
3,411,809　11/1968　Kampert ....................... 254/132 X Primary Examiner—Andrew R. Juhasz
Assistant Examiner—David R. Melton
Attorney—Edwin E. Greigg ABSTRACT: A device for partially raising a public works machine or the like comprising two articulated chassis elements wherein means are provided for partially raising the machine in such manner that in working position one of the elements rest on the ground through its normal rolling members such as wheels or through immobilizing means such as props, and through the said partial raising means, while the other chassis element is wholly raised from the ground nd can turn relative to the first chassis part about the axis of articulation of the chassis and relative to the ground about the said partial raising means.

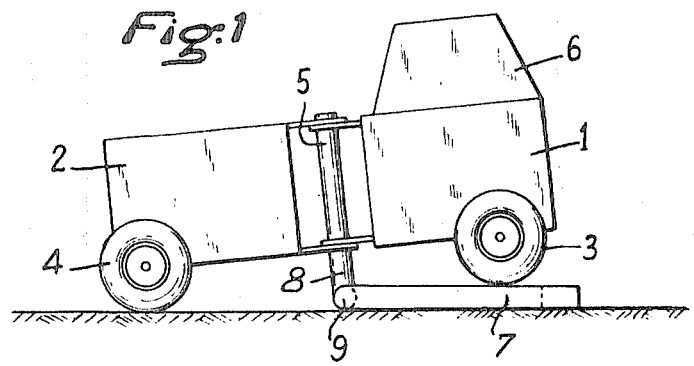
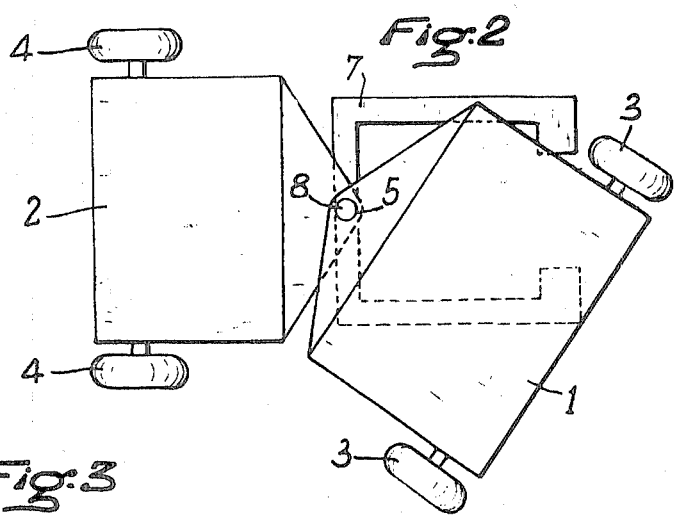
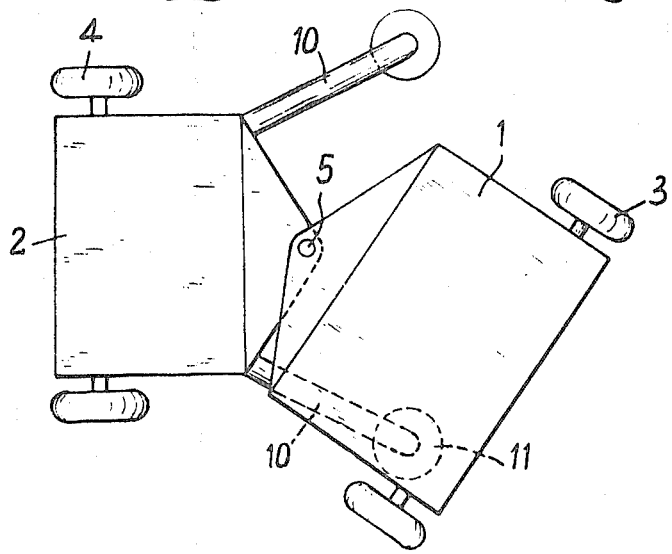

ARTICULATED PUBLIC WORKS MACHINE OR VEHICLE

The present invention relates to devices for partially raising a public works machine or the like, the chassis of which is articulated. The fact that the chassis is articulated enables its two elements to be capable of relative rotational movement about a vertical axis of articulation, which facilitates its use.

The principal objects of the invention are to increase the mobility of public works machines when in working position and to enable the articulations to be utilized with the machine in working position without having to provide any supplementary device.

In accordance with the invention a device for partially raising a public works machine or the like comprising two articulated chassis elements is characterized by the feature that means are provided for partially raising the machine in such manner that in working position one of the elements rests on the ground through its normal rolling members such as wheels or through immobilizing means such as props, and through the said partial raising means, while the other chassis element is wholly raised from the ground and can turn relative to the first chassis part about the axis of articulation of the chassis and relative to the ground about the said partial raising means.

Various practical arrangements may be provided for the performance of the invention.

Firstly, the means for supporting on the ground may be constituted by a platform or by props, as the case requires.

Furthermore, the said raising means may be coupled either with the chassis element that remains in contact with the ground or with the chassis element that is wholly raised from the ground, or even with the region of articulation.

Figure 5:
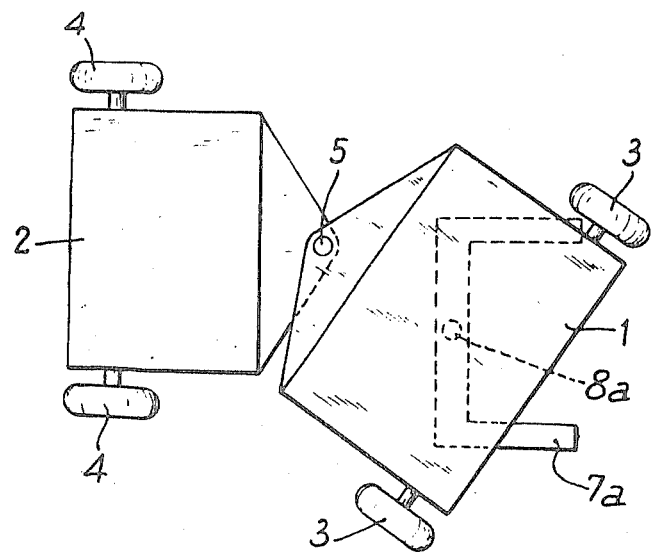

Embodiments of the invention will now be described with reference to the accompanying diagrammatic drawings, in which:

FIG. 1 shows in elevation a machine equipped with a device according to the invention, the machine being in a raised position, FIG. 2 shows the machine of FIG. 1 in one of its working positions, FIG. 3 shows a modified machine, FIG. 4 shows another modification, and FIG. 5 is a plan view of the machine of FIG. 4 in one of its working positions.

In the particular application considered a public works or like machine mounted on wheels has been illustrated. The machine includes two chassis parts 1 and 2 mounted respectively on wheels 3 and 4. The articulation means of the two chassis parts is located between them and is shown at 5. The part 1 may be regarded as a front part and may carry a control cabin 6. Each of the parts may also carry tools of the mobile shovel type for handling material. In the following description the part 1 will be termed the front part while the part 2 will be termed the rear part.

In FIG. 1 the raising of the machine is effected with the aid of a platform 7 which is for example of U-shape and is adapted to rest on the ground over a sufficiently large area. However, the platform 7 is actuable in such manner that when the machine is not in working position it may be retracted against the bottom of the front part 1 and between the front wheels 3.

In its central part the platform 7 accommodates a control rod 8 which coincides with the geometric axis of articulation 5. Moreover, the rod 8 may constitute the actual articulation shaft between the two chassis parts 1 and 2.

Control of the rod 8 may be effected by any desired means, for example mechanical or hydraulic means, and from one or other of the elements 1 and 2.

In order to raise the front of the machine, with the platform 7 still flat against the underside of the element 1 it is sufficient to actuate the rod 8, thereby causing lowering of the platform 7 until it comes into contact with the ground and raising of the front part 1 to the required height. During this movement the rear wheels 4 remain in contact with the ground, and it will be advantageous to provide props or feet (not shown) suitable for immobilizing the part 2 in a more certain manner; the part 2, as will be seen, remains stationary relative to the ground in working position. During the raising of the front of the machine this part turns through a few degrees about the horizontal axis of the wheels 4. As this occurs, the rod 8 also turns. This is why it will be advantageous to provide, between the rod 8 and the platform 7, limited articulation means 9 permitting this rotation.

In this embodiment the rear part 2 is immobilized during the working phase, that is to say when the front part 1 is raised. In fact, the rear part 2 is immobilized and supported by the platform 7 and by its wheels 4 or by any props that may be used. In contrast, the front part 1 is free to turn about the geometric axis of the rod 8. The means for effecting the rotation of the front part 1 may be of any form, for example mechanical or hydraulic means. Use may for example be made of at least one jack interconnecting the two parts 1 and 2.

In the embodiment shown in FIG. 3 the means for partially raising the machine are constituted by two arms or props 10 extending into feet 11. When the machine is travelling the arms 10 are folded under the chassis part 2 whereas when in working position they are deployed into inclined and diverging positions. As in the case of FIGS. 1 and 2, the rear part 2 remains stationary in the working position while the chassis part 1 raised by the arms 10 can pivot about the articulation means 5.

In the embodiment shown in FIGS. 4 and 5 the means for partially raising the vehicle are, as in the case of FIG. 1 and 2, constituted by a single rod 8a which is offset relative to the articulation axis 5 and is carried only by the part 1. The platform 7a may again be of any desired shape, for example of H-, U- or T-shape. In this embodiment articulation means 9a are also provided between the platform 7a and the rod 8a since, when the chassis is raised, it becomes inclined to the ground.

In working position the rear part 2, as before, rests on the ground. In this position, as shown in FIG. 5, the front chassis part 1 can turn about the rod 8a under the same conditions as before. However, this rotation causes a rotational displacement of the articulation axis 5 about the rod 8a. In consequence, when the front element 1 turns the rear part 2 is movable in this case and no props or feet are provided for the part 2. In the position shown in FIG. 5 the part 1 has been clockwise turned, and this has caused movement to the right of the articulation axis 5 and in consequence a forward and counterclockwise movement of the rear part 2.

In order to reestablish contact between the front wheels 3 and the ground it is first necessary, in the case in which a platform and the rod 8 or 8a are used, to return the front part 1 to its initial position, after which the rod is retracted against the front chassis part 1. From the above it will therefore be seen that the means for partially raising the machine may be either a platform or props. When the said means have more than one point of connection with the chassis, they may be connected to the rear chassis part 2 in such manner than the front part 1 is free to turn when in working position.

Of course, there may be various forms of the device according to the invention. Thus, when props are provided they may be connected to the front part, only one connecting rod being provided for permitting rotation. It is also possible to provide a platform, similar to the platform 7 or 7a, controlled by one or more rods connected to the rear part 2.

Whatever practical form is adopted, the device according to the invention has numerous advantages, amongst which the following may be mentioned:

The invention permits rotation of the equipment carried by the machine about its axis of articulation, thereby obviating the provision of an individual pivot axle for each piece of equipment.

The rotation relative to the axis of the machine is added to that of the equipment relative to the chassis parts.

The operator can always be facing his equipment during rotation of the latter relative to the articulation axis of the machine.

What I claim is:

1. A public works machine or the like comprising two chassis parts articulated together, wherein means are provided for partially raising the machine in such manner that in working position one of the chassis parts rests on the ground trough its normal rolling members such as wheels or through immobilizing means such as props, and through the said partial raising means, whereas the other chassis part is wholly raised from the ground and can turn relative to the first chassis part about the axis of articulation of the chassis and relative to the ground about the said partial raising means.

2. A machine according to claim 1, wherein the partial raising means are connected to the chassis part which in working position is wholly raised.

3. A machine according to claim 1, wherein the partial raising means are connected to the chassis where the two elements are articulated.

4. A machine according to claim 1, wherein the partial raising means are connected to the chassis part which in working position rests on the ground.

5. A machine according to claim 1, wherein the partial raising means comprise a platform for bearing on the ground.

6. A machine according to claim 1, wherein the partial raising means comprise props for bearing on the ground.

7. A machine according to claim 4, wherein the members for bearing on the ground are connected at least two points to the chassis part which in working position rests on the ground.

8. A machine according to claim 1, wherein the members for bearing on the ground are connected to at least one of the chassis parts by a single rod or the like.

9. A machine according to claim 8, wherein the rod constitutes the articulation axle of the two chassis parts.

10. A machine according to claim 8, wherein the rod constitutes an axle for rotation relative to the ground of that chassis part which in working position is wholly raised from the ground.

11. A machine according to claim 1, wherein the articulation axle of the two chassis parts constitutes an axle for rotation relative to the ground of the chassis part which in working position is wholly raised from the ground.

12. A machine according to claim 1, wherein in working position the chassis part that rests directly on the ground has means for rendering it immobile.

13. A machine according to claim 2, wherein in working position the chassis part that rests directly on the ground is movable.

* * * * *